US005199746A

United States Patent [19]
Pan

[11] Patent Number: 5,199,746
[45] Date of Patent: Apr. 6, 1993

[54] CONNECTOR STRUCTURE FOR MIXED TYPE OF FAUCET

[76] Inventor: Chin-Ding Pan, No. 7, Lane 155, Sec. 4 Lu Ho Road, Lu Kang Town, Changhua Hsien, Taiwan

[21] Appl. No.: 799,215

[22] Filed: Nov. 27, 1991

[51] Int. Cl.$^5$ .............................................. F16L 55/00
[52] U.S. Cl. ............................................ 285/8; 285/64; 285/179; 285/261; 285/332.1
[58] Field of Search ................... 285/179, 12, 8, 130, 285/261, 332.1, 355, 64

[56] References Cited

U.S. PATENT DOCUMENTS

| | | | |
|---|---|---|---|
| 964,315 | 7/1910 | Reed | 285/332.1 |
| 1,437,082 | 11/1922 | Armstrong | 285/8 |
| 2,988,385 | 6/1961 | Foelster et al. | 285/332.1 X |
| 3,074,746 | 1/1963 | Shames et al. | 285/8 |
| 3,831,983 | 8/1974 | Stickler | 285/12 |
| 3,879,064 | 4/1975 | Lagarelli | 285/12 |
| 4,522,433 | 6/1985 | Valentine et al. | 285/261 X |
| 5,024,419 | 6/1991 | Mulvey | 285/332.1 |

FOREIGN PATENT DOCUMENTS 0359651 10/1931 United Kingdom ................... 285/8

Primary Examiner—Eric K. Nicholson
Assistant Examiner—Heather Chun
Attorney, Agent, or Firm—Browdy and Neimark

[57] ABSTRACT

A biasable connector structure for mixed type of faucet, which can be suitably connected with a water pipe imbedded in a wall in a resilient manner to prevent the faucet seat from being damaged and avoid leaking of water due to improper connection; the connector structure includes a hexagon nut, a spherical connector (or semispherical connector or conic connector), an O-ring, a water sealing gasket and a Z-shaped connecting pipe, whereby when assembled, the spherical connector is first extended through the hexagon nut to be screwed on the faucet seat, and then the hexagon nut is screwed with the Z-shaped connecting pipe with an inner flange of the hexagon nut forcing the spherical connector toward the Z-shaped connecting pipe, a water sealing gasket being disposed between the connecting pipe and the spherical connector, permitting the spherical connector to be biased through an angle without leaking of water.

3 Claims, 5 Drawing Sheets

CONNECTOR STRUCTURE FOR MIXED TYPE OF FAUCET

BACKGROUND OF THE INVENTION

The present invention relates to a connector structure for a mixed type of faucet, which includes a hexagon nut, a spherical connector, a water-sealing gasket, an O-ring and a Z-shaped connecting pipe, wherein the spherical connector is screwed on an inlet pipe of the faucet seat. The spherical connector is formed with an annular groove at one end thereof which is adapted to biasably fit with an inner flange of the hexagon nut so that the nut can be biased through a certain angle. The water-sealing gasket is placed over the spherical connector and is closely attached thereto by means of the connection of the Z-shaped connecting pipe. The connector structure of the present invention can be connected to a water pipe in accordance with the inclined angle thereof while effectively avoiding leaking of water and damage of the water pipe or the faucet seat.

In a water supply facility, a faucet seat is connected with a water pipe for providing water. However, the water pipe is often disposed in a biased position due to working error and cause the connection between the faucet seat and the water pipe becomes difficult. Such drawback is especially seen in a mixed type of faucet. As shown in FIG. 1, a conventional faucet connector structure includes a faucet seat 10, a nut 11, a screwing pipe 12, a connecting pipe 13, etc. When assembled, the screwing pipe 12 is screwed into the pipe openings 14, 15 of the faucet seat 10 and then the nut 11 is screwed thereon and the connecting pipe 13 is screwed thereon. The connecting pipe 13 is then connected with a water pipe. Such connection is performed in a fixed manner without movability. As a result, in case the water pipe is in a biased state, the faucet seat will be connected therewith difficultly and after such connection, the following problems quite often occur: 1. The water pipe suffers a bending moment and is apt to break due to unsuitable connection. 2. The thread of the pipe opening of the faucet seat is easily damaged due to an unsuitable connection and the usable life of the faucet seat is thus shortened. 3. A clearance exists between the faucet seat and the water pipe due to improper connection so that water often leaks through the clearance.

SUMMARY OF THE INVENTION

It is therefore a primary object of this invention to provide a connector structure for a faucet seat, which is biasable for suitably connecting with a biased water pipe so that the water pipe and faucet seat will not be damaged due to improper connection.

It is a further object of this invention to provide the above connector structure having a water sealing gasket which enables the connector to be freely biased without leaking of water.

It is still a further object of this invention to provide the above connector structure which reduces the possibility of damage of the faucet seat and water pipe and eliminate the problem of poor quality thereof so as to prolong the using life thereof.

According to the above objects, the connector structure of the present invention includes a hexagon nut, a spherical connector (semispherical or conic connector), an O-ring, a water-sealing gasket and a Z-shaped connecting pipe, wherein the spherical connector is made of a suitable metal, having a spherical end and another pipe-shaped end. The spherical connector is formed with a central axial hole and the pipe-shaped end thereof is formed with outer thread whereby the pipe-shaped end can be extended through the hexagon nut to be screwed on the faucet seat. An annular groove is formed on the middle portion of the spherical connector whereby the O-ring can be fitted therein for prevent water from leaking. The Z-shaped connecting pipe is screwed on the water pipe imbedded in the wall and the hexagon nut is then screwed on the Z-shaped connecting pipe. By means of the inner flange of the hexagon nut, the spherical connector is forced toward the Z-shaped connecting pipe. A water sealing gasket is disposed between the spherical connector and Z-shaped connecting pipe for preventing the water from leaking. The hexagon nut can be biased through a proper angle with its inner flange moved along the surface of the spherical connector so as to suit various biased states of the water pipe embedded in the wall and achieve proper connection.

BRIEF DESCRIPTION OF THE DRAWINGS

FIGS. 4-1 and 4-2 are sectional views showing the normal and biased connection state of a spherical connector A; and FIGS. 5-1 and 5-2 are sectional views showing the normal and biased connection state of a semispherical connector B.

DETAILED DESCRIPTION OF THE PREFERRED EMBODIMENT

Figure 2:
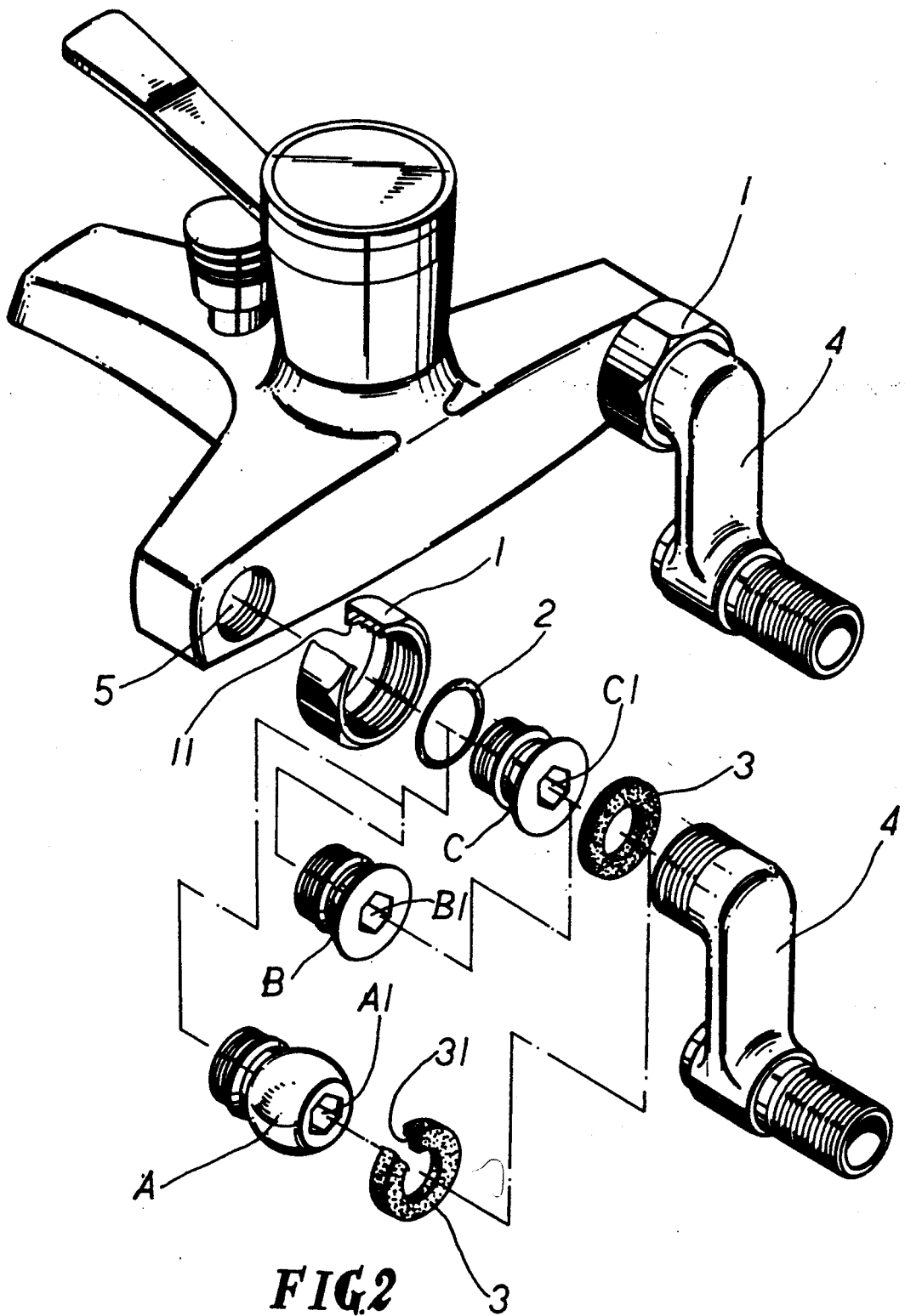
FIG. 2 shows a perspective assembled view and exploded view of this invention.
Figure 3:
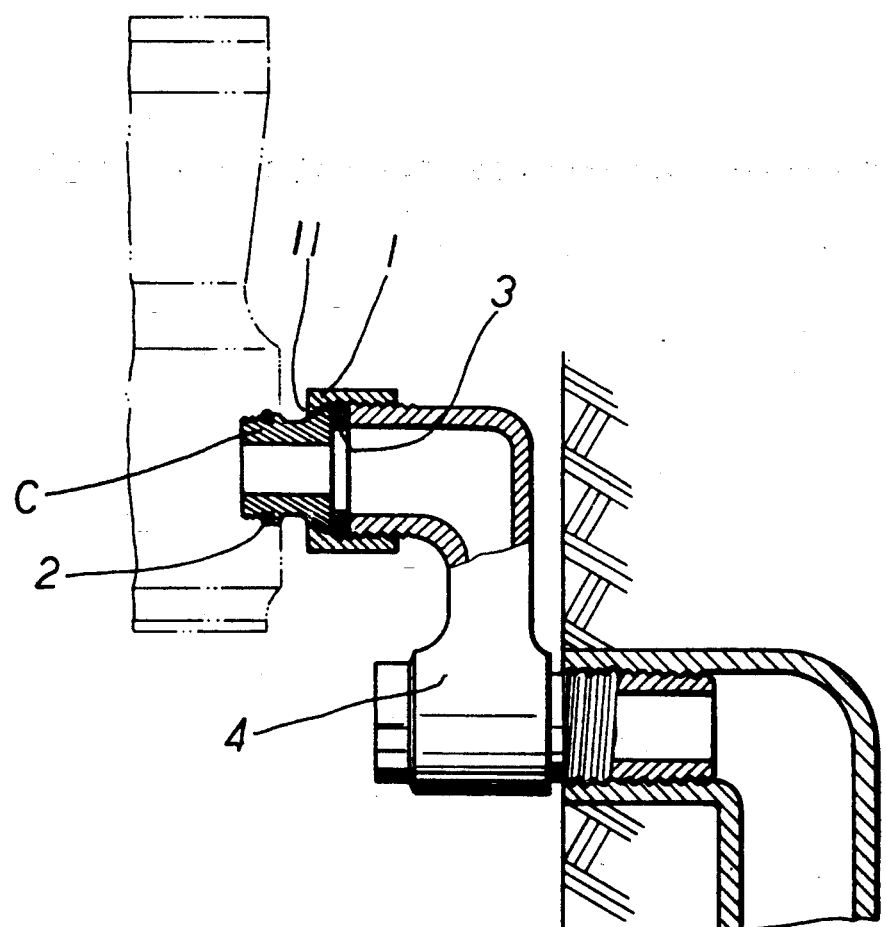
FIG. 3 is a sectional view showing the connection state of a conical connector C.

Please refer to FIG. 2. The present invention includes a hexagon nut 1, a spherical connector A, an O-ring 2, a water sealing gasket 3 and a Z-shaped connecting pipe 4, wherein the spherical connector A can be replaced with a semispherical connector B or a conical connector C and is made of a proper metal. One end of the spherical connector A is pipe-shaped while the other end thereof is spherically shaped (or semispherically shaped or conically shaped). The spherical connector A is formed with a central axial hole A1 (or axial hole B1 for semispherical connector B or axial hole C1 for conic connector C). The pipe-shaped end is formed with outer thread and the opening of the hole A1 is hexagonal at the spherical end so that a hexagonal wrench can be extended thereinto. The assembling is performed in such a manner that the pipe-shaped end with thread is extended through the hexagon nut 1 to be screwed with the inlet 5 of the faucet seat. An annular groove is formed on the middle portion of the spherical connector A whereby an O-ring can be fitted therein for avoid leaking of water.

The Z-shaped connecting pipe 4 is screwed with the water pipe imbedded in the wall, and the hexagon nut 1 is screwed on the Z-shaped connecting pipe 4. By means of the inner flange 11 of the hexagon nut 1, the spherical connector A (or semispherical connector B or conical connector C) is forced toward the Z-shaped connecting pipe 4. A water sealing gasket 3 is disposed between the spherical connector A and Z-shaped connecting pipe 4. The surface of the water sealing gasket 3, which faces the spherical connector A is correspondingly spherically shaped. In case of a semispherical connector B or conical connector C, a general water sealing gasket 3 is suitable for avoid leaking of water as shown in FIGS. 3, 5-1 and 5-2.

Figure 1:
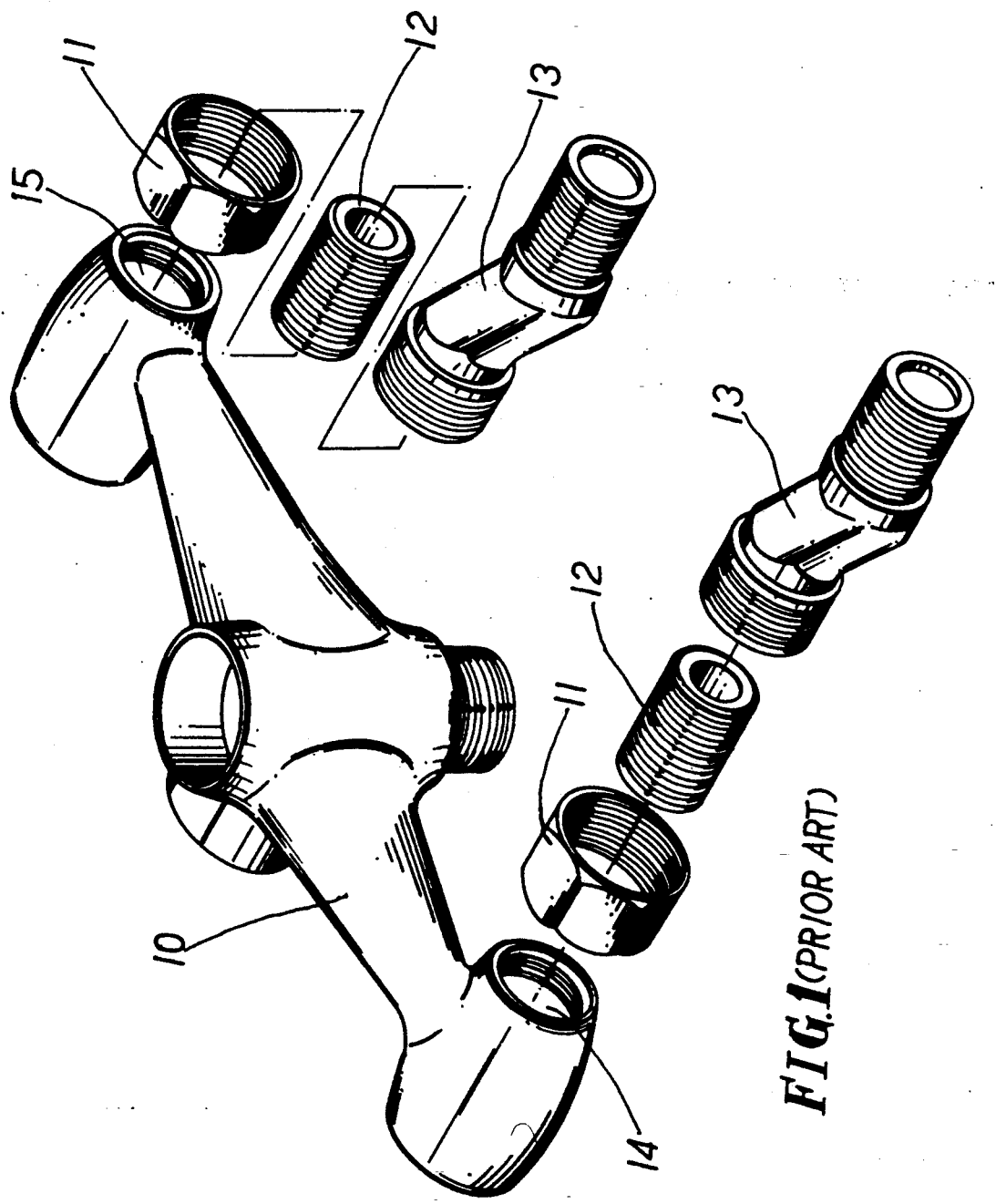
FIG. 1 is a perspective exploded view of a conventional faucet connector.
Figures 1, 4:
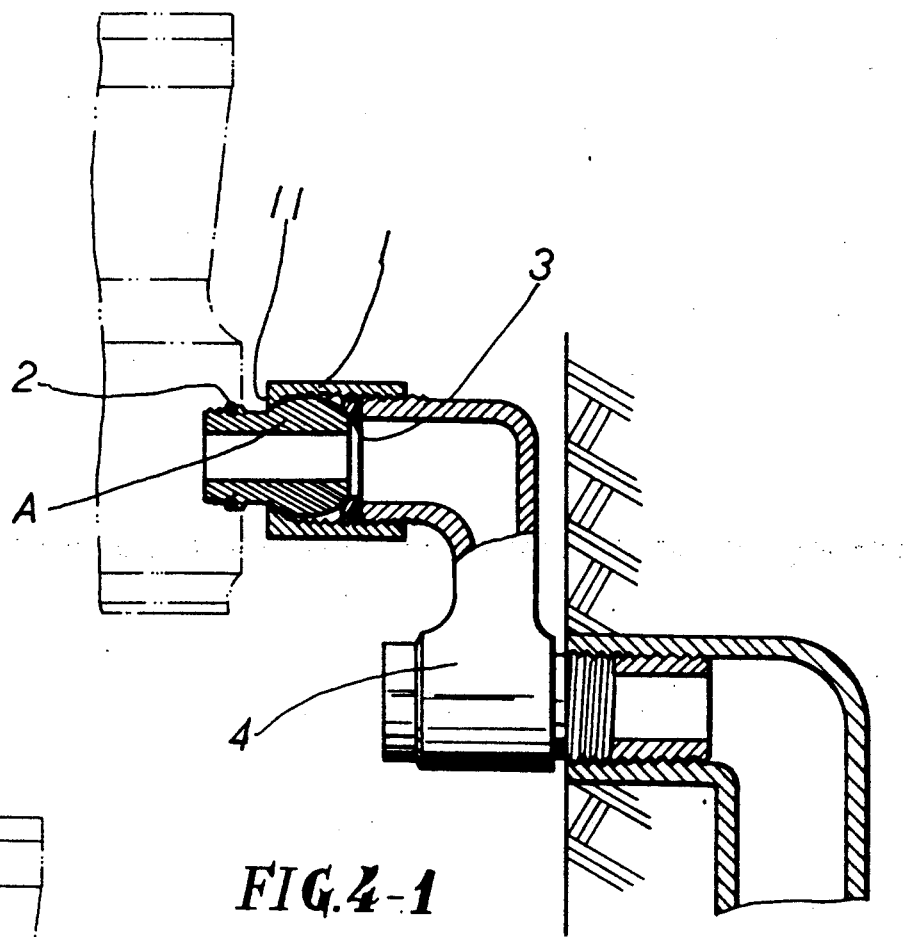
Figures 2, 4:
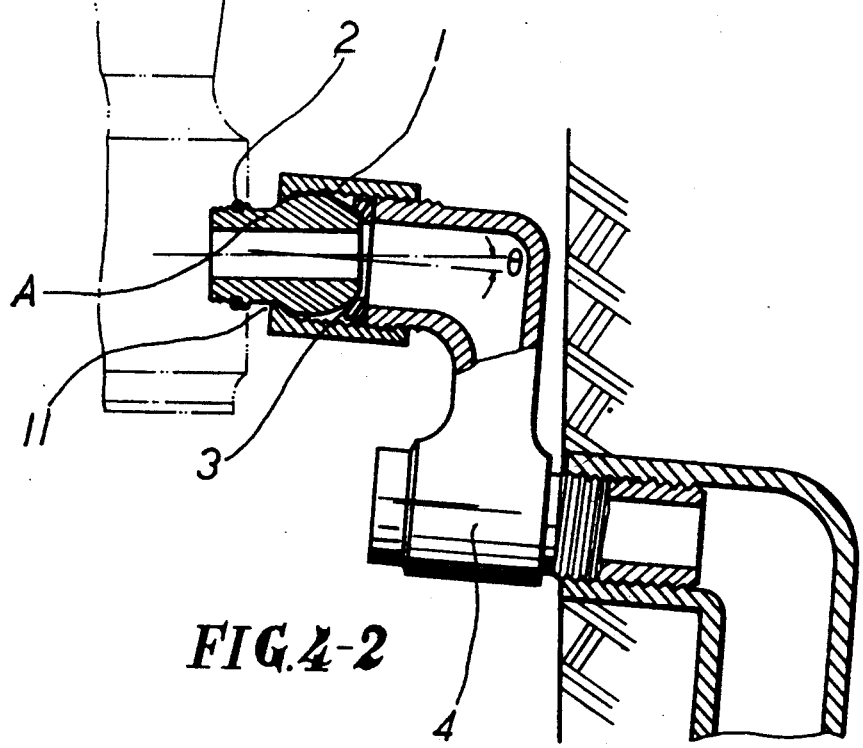

Referring to FIGS. 4-1, and 4-2, the spherical connector A can be normally connected with the hexagon nut 1 or be biased through a certain angle with the inner flange 11 of the hexagon nut 1 relatively moved along the spherical surface thereof so that even under a biased circumstance, the faucet seat can still suitably closely connect with the water pipe imbedded in the wall.

Figures 1, 5:
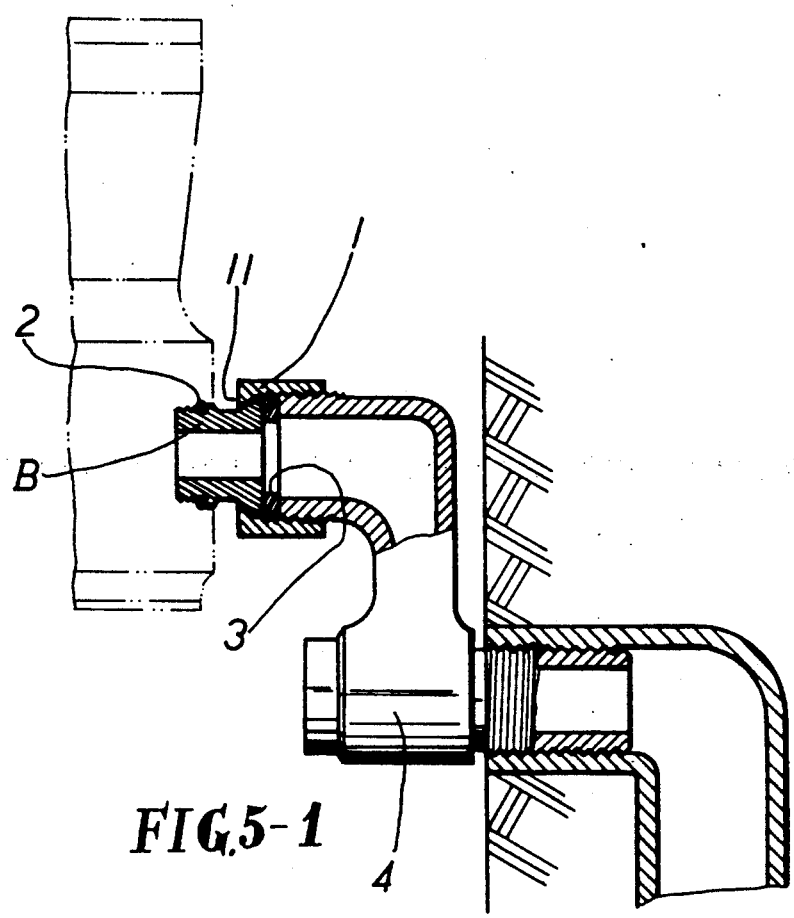
Figures 2, 5:
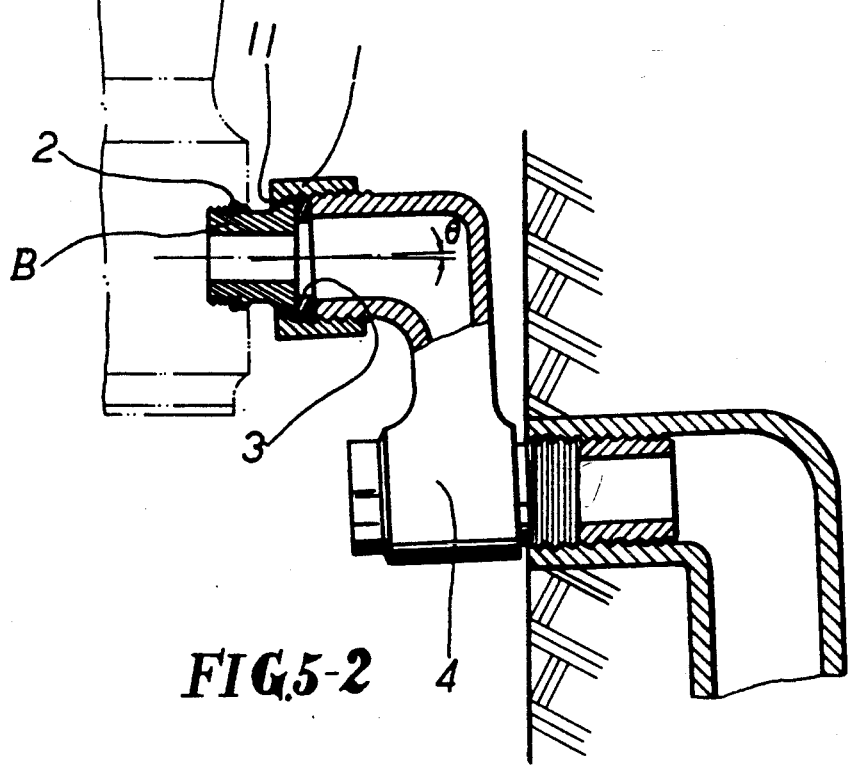

As shown in FIGS. 5-1, and 5-2, similarly, the semi-spherical connector B can be biased through an angle $\theta$ to suitably closely connect with a biased water pipe.

What is claimed is:

1. A connector structure for mixed type of faucet, comprising a hexagon nut, a spherical connector, an O-ring, a water sealing gasket and a Z-shaped connecting pipe, wherein said spherical connector has a spherical end and a pipe-shaped end and is formed with a central axial hole, said pipe-shaped end of said spherical connector being formed with outer threads, said axial hole of said spherical connector having a hexagonal cross-section, an annular groove being formed on a middle portion of said spherical connector whereby said O-ring can be fitted therein when assembled, wherein when said spherical connector is first extended through said hexagon nut, said spherical connector is screwed on a faucet seat and then said Z-shaped connecting pipe is screwed with a water pipe imbedded in a wall and then said hexagon nut is screwed with said Z-shaped connecting pipe, said hexagon nut having an inner flange at its one end, which forces said spherical connector toward said Z-shaped connecting pipe, said water sealing gasket being disposed between said spherical connector and Z-shaped connecting pipe, a surface of said water sealing gasket, which contacts with said spherical connector, being spherically shaped correspondingly, whereby in case the water pipe is biased, said inner flange of said hexagon nut can closely move along the spherical surface of said spherical connector, permitting said spherical connector to be biased through an angle for suitably connecting with the water pipe.

2. A connector structure for mixed type of faucet, comprising a hexagon nut, a semi-spherical connector, an O-ring, a water sealing gasket and a Z-shaped connecting pipe, wherein said semi-spherical connector has a semi-spherical end and a pipe-shaped end and is formed with a central axial hole, said pipe-shaped end of said semi-spherical connector being formed with outer threads, said axial hole of said semi-spherical connector having a hexagonal cross-section, an annular groove being formed on a middle portion of said semi-spherical connector whereby said O-ring can be fitted therein when assembled, wherein when said semi-spherical connector is first extended through said hexagon nut, said semi-spherical connector is screwed on a faucet seat and then said Z-shaped connecting pipe is screwed with a water pipe imbedded in a wall and then said hexagon nut is screwed with said Z-shaped connecting pipe, said hexagon nut having an inner flange at its one end, which forces said semi-spherical connector toward said Z-shaped connecting pipe, said water sealing gasket being disposed between said semi-spherical connector and Z-shaped connecting pipe, a surface of said water sealing gasket, which contacts with said semi-spherical connector, being semi-spherically shaped correspondingly, whereby in case the water pipe is biased, said inner flange of said hexagon nut can closely move along the semi-spherical surface of said semi-spherical connector, permitting said semi-spherical connector to be biased through an angle for suitably connecting with the water pipe.

3. A connector structure for mixed type of faucet, comprising a hexagon nut, a conical connector, an O-ring, a water sealing gasket and a Z-shaped connecting pipe, wherein said conical connector has a conical end and a pipe-shaped end and is formed with a central axial hole, said pipe-shaped end of said conical connector being formed with outer threads, said axial hole of said conical connector having a hexagonal cross-section, an annular groove being formed on a middle portion of said conical connector whereby said O-ring can be fitted therein when assembled, wherein when said conical connector is first extended through said hexagon nut, said conical connector is screwed on a faucet seat and then said Z-shaped connecting pipe is screwed with a water pipe imbedded in a wall and then said hexagon nut is screwed with said Z-shaped connecting pipe, said hexagon nut having an inner flange at its one end, which forces said conical connector toward said Z-shaped connecting pipe, said water sealing gasket being disposed between said conical connector and Z-shaped connecting pipe, a surface of said water sealing gasket, which contacts with said conical connector, being conically shaped correspondingly, whereby in case the water pipe is biased, said inner flange of said hexagon nut can closely move along the conical surface of said conical connector, permitting said conical connector to be biased through an angle for suitably connecting with the water pipe.

* * * * *